(12) United States Patent
Vanderlee

(10) Patent No.: US 6,237,640 B1
(45) Date of Patent: *May 29, 2001

(54) VARIABLE LENGTH PIPE REPAIR FITTING

(75) Inventor: Keith Wayne Vanderlee, Romeoville, IL (US)

(73) Assignee: Nicor Technologies, Naperville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/614,622

(22) Filed: Jul. 12, 2000

Related U.S. Application Data

(63) Continuation-in-part of application No. 09/481,183, filed on Jan. 12, 2000.

(51) Int. Cl.$^7$ .................................................. F16L 55/168
(52) U.S. Cl. ................................. 138/99; 138/98; 138/92; 138/162
(58) Field of Search ................................. 138/97, 98, 99, 138/92, 162

(56) References Cited

U.S. PATENT DOCUMENTS

| | | | |
|---|---|---|---|
| 3,982,564 | * 9/1976 | Clabburn et al. .................... 138/99 |
| 4,236,949 | * 12/1980 | Horsma et al. ...................... 138/99 |
| 4,421,582 | * 12/1983 | Horsma et al. ...................... 138/123 |
| 4,429,213 | * 1/1984 | Mathieu ............................... 138/103 |
| 4,695,335 | * 9/1987 | Lyall .................................... 138/155 |
| 4,927,184 | * 5/1990 | Bourjot et al. ....................... 138/141 |
| 4,944,987 | * 7/1990 | Cordia et al. ........................ 138/156 |
| 5,236,765 | * 8/1993 | Cordia et al. ........................ 138/156 |
| 5,476,562 | * 12/1995 | Inhofe, Jr. ............................ 138/144 |
| 5,606,997 | * 3/1997 | Blackmore et al. .................. 138/98 |
| 5,662,974 | * 9/1997 | Andrenacci et al. ................. 138/155 |
| 6,043,466 | * 3/2000 | Jenko et al. .......................... 138/33 |

* cited by examiner

Primary Examiner—James Hook
(74) Attorney, Agent, or Firm—Orum & Roth

(57) ABSTRACT

An expandable repair fitting for sealing and reinforcing polyethylene pipe includes a single or multiple middle section(s) that receives two end sections. The three sections are split into halves in order for the fitting to encapsulate the entire pipe to be repaired. Electrical heating elements in the form of wires are embedded within each section. The specific location of the wires causes the jointed halves to melt together when an electrical source is supplied to the wires, as well as causing a portion of each end piece to melt about the outer pipe diameter, thereby forming a sealed repair fitting. A portal is provided on the middle section to allow pressure testing of the integrity of the fitting. In a second embodiment, the repair fitting does not encapsulate the entire pipe circumference.

26 Claims, 4 Drawing Sheets

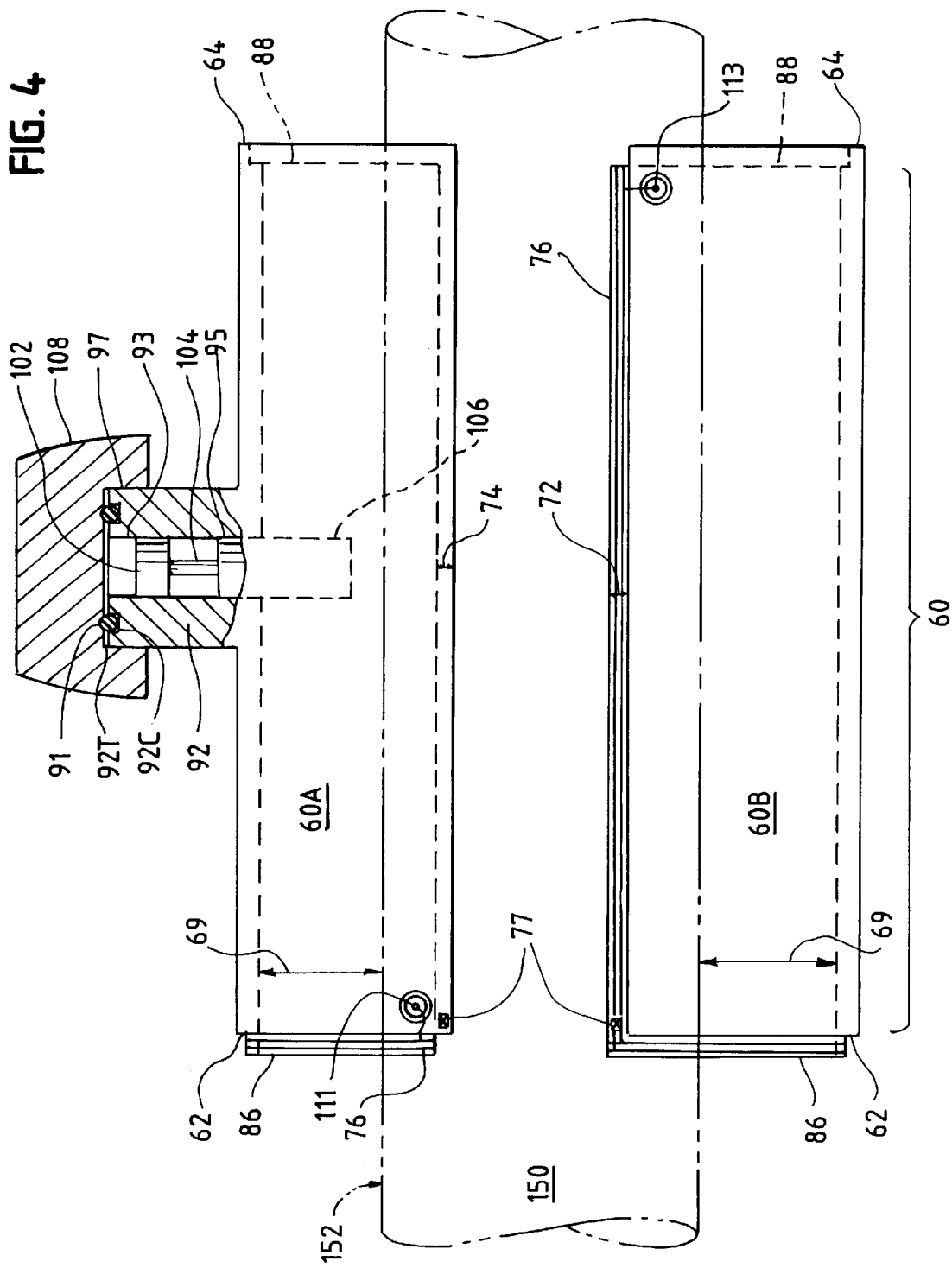

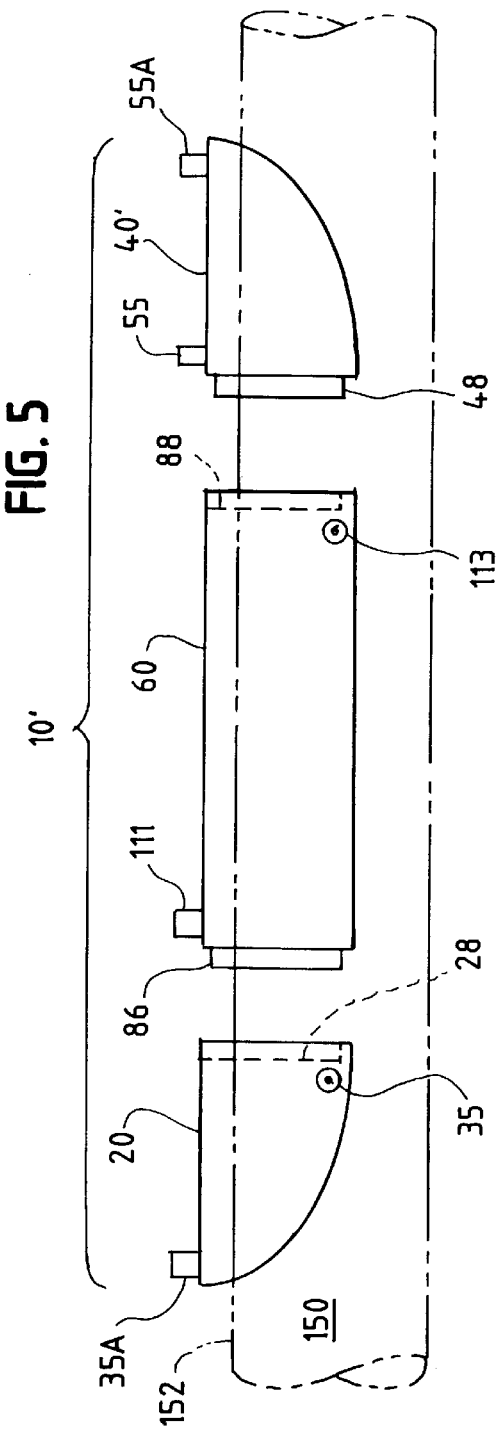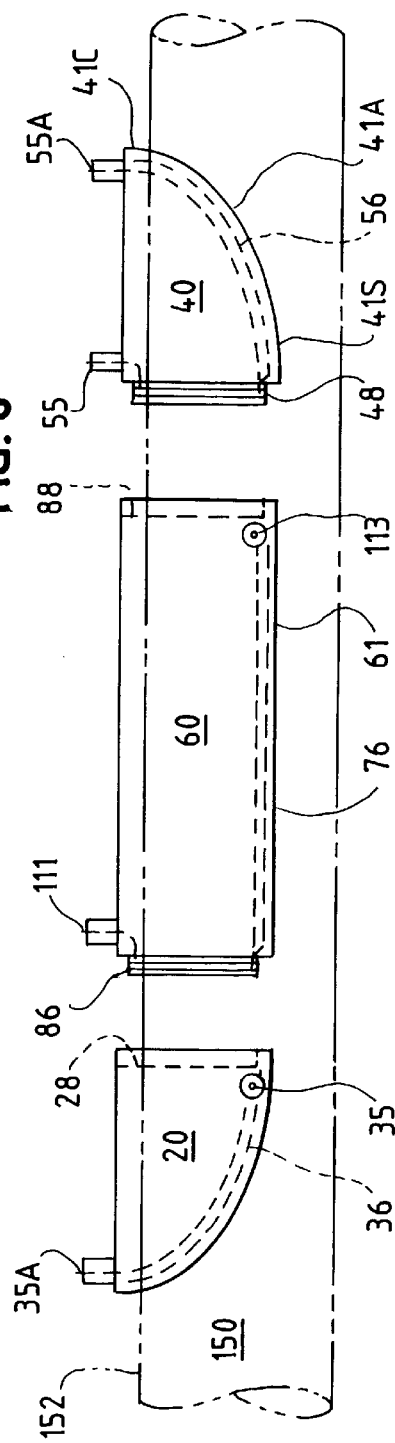

VARIABLE LENGTH PIPE REPAIR FITTING

This is a continuation-in-part of copending application(s) U.S. application Ser. No. 09/481,183 filed on Jan. 12, 2000.

BACKGROUND OF THE INVENTION

The present invention pertains to apparatus related to the repair of live mains lines. More specifically it pertains to variable length repair fitting for use in repairing or reinforcing polyethylene pipelines.

Fluid pipelines were mainly constructed of steel or even cast steel, and were subject to severe corrosion problems as they were buried underground. With the event of plastics, broader usage of different types of elastomeric materials has found favor with the gas pipeline industry. Thus, it is very common for gas pipelines to be constructed entirely out of plastics, especially polyethylene, since such pipelines exhibit excellent corrosion resistance.

However, many of the problems associated with the steel pipelines still occur with the plastic pipelines. For example, uncovering pipelines requires digging the earth around the line, sometimes leading to heavy equipment operators to severely scratch or even rupture the lines. Repairing plastic pipelines requires either spot repairing with traditional clamp and bladder techniques, or by cutting and replacement of the damaged section. It is therefore an object of the present invention to provide an improved method and apparatus for repairing a damaged polyethylene pipeline where the line does not require physical cutting and replacement of the damaged or weakened section.

SUMMARY OF THE INVENTION

The present invention provides a repair fitting apparatus that can be applied to a damaged or weakened carrier pipeline so as to entirely encapsulate the pipeline in the event of a ruptured pipeline, or to partially encapsulate it when the pipeline has been weakened, most likely through severe gouging or scratching.

In one embodiment, the repair fitting comprises three components; a midsection encapsulating piece for entirely enveloping the pipeline, and two connecting end pieces, which also entirely encapsulate the pipeline. The encapsulating midsection piece has male and female connector components at alternate ends thereof which allow additional sections to be added in the event one section is not long enough to cover the damage. The end pieces each have complementary male or female connector components on one respective end thereof which functionally slides into the encapsulating piece to form the fitting. The other ends of each end piece are constructed to closely contact the outer surface of the carrier pipe, while the end provided with the connector is constructed so as not to contact the outer surface but rather to create an annular interior space between the end piece and pipelines. Likewise, because the encapsulating piece attaches to the end of the pieces where the annular space is formed, the encapsulating section envelopes the carrier pipeline but does not rest in close contact against it.

In another embodiment, these components are again used, but rather than a male into female connection, there is a stepped connector construction with overlapping inside and outside contact points.

Internal heating wires are disposed in the wall thickness and male connector components of all three components of the fitting. When supplied with an electrical source, the wires cause the components to melt along connection points there between and to melt the ends of each end piece which is in close contact against the pipeline, thereby sealing the fitting to the pipelines. In this way, a portal provided on the midsection piece can be used to established communication between the pipeline interior and atmosphere, actually allowing a gas escape route. However, the portal is sealable and prior to sealing, the gas purges all entrapped air from the fitting interior so that gas/air mixture explosion limits will have been reached and surpassed during purging.

In the case of the stepped connector construction of the inside and outside contact points, heating wires are disposed proximate the inside contact points.

In a second embodiment more specific to reinforcing a gouged or scratched pipeline, the three components are in full contact against the pipeline outside surface. Electric supply to internally embedded heating wires causes the connection points between the pieces to melt together, as well as the entire perimeter of the fitting to melt in place against the pipeline.

DETAILED DESCRIPTION OF THE DRAWINGS

FIG. 4 is a partial cross-sectional view through the encapsulating piece in place over the carrier pipe, emphasizing the electrical wires implanted therein and the sealing portal;

FIG. 5 is a schematic view of a second embodiment of the present invention, showing a partial application over the carrier pipe;

FIG. 6 is a schematic view of the embodiment shown in FIG. 5, emphasizing location of the electrical wires along a perimeter edge of the repair fitting elements.

DETAILED DESCRIPTION OF THE PREFERRED EMBODIMENT

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

Figure 1:
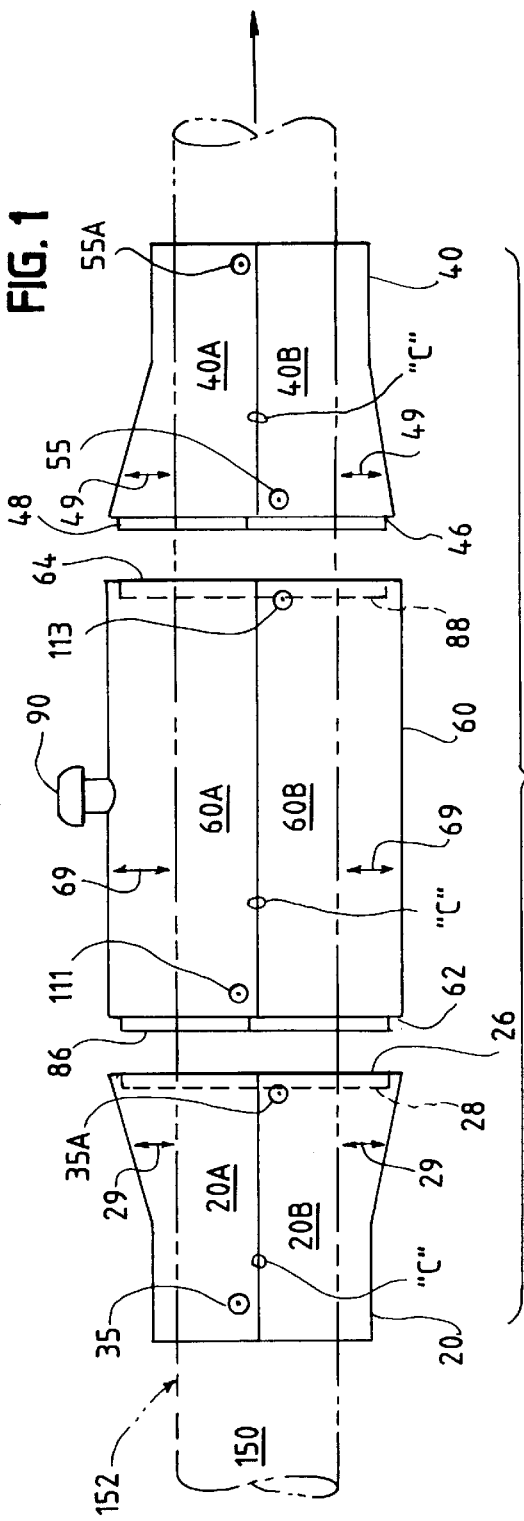
FIG. 1 is a schematic view showing the repair fitting of the present invention in place over a carrier pipe to be fixed.

Repair fitting 10, shown in FIG. 1, includes a left and a right end piece 20, 40 and a mid-section piece 60 referred to herein as an encapsulating piece. In one embodiment, each of the pieces comprising the repair fitting I 0, fully envelope the carrier pipe 150 at a location which requires repair or reinforcement. Thus, it should be understood that pieces 20, 40, and 60 are respectively comprised of two half sections (i.e. 20A, 20B) which are first positioned about the pipe, before the halves are connected together. Each of the respective halves, when connected together, form a pair of connection edges "C", which correspond with the longitudinal axis L of carrier pipe 150.

The left end pieces 20A, 20B, as shown in FIG. 1, will now be described in greater detail with respect to how they connect together, although it should be understood that sections 40 and 60 also connect together in the same fashion and therefore, will not be described in greater detail.

Figure 2A:
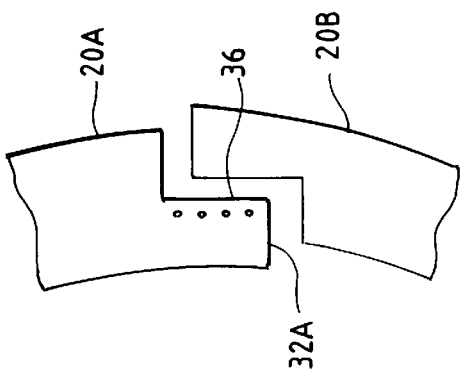
FIG. 2a is a partial cross-sectional view showing the detail of a stepped connector joint which connects the repair fitting elements shown in FIG. 1.
Figure 2:
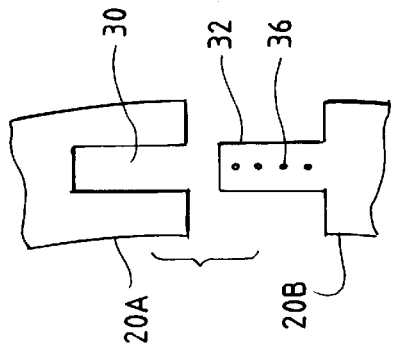
FIG. 2 is a partial cross-sectional view showing the detail of a male into female joint which connects the repair fitting elements shown in FIG. 1.

The upper section 20A includes a channel 30 formed therein, and lower section 20B includes lip 32 (FIG. 2). For each piece, 20, 40 and 60, the channel and lip combination are formed along the entire length of the shown connecting edge "C" for that representative piece, and on opposite diametric locations thereof. The channel 30 represents a female connector, while the lip 32 represents a male connector, each of which press together to matingly connect the respective upper and lower sections. The channel and lip are of a predetermined dimension to ensure a relatively tight friction fit, and when larger carrier pipe diameters are involved, the size of the channel and lip increases accordingly. Although the top section 20A was shown to include the channel 30, either of the sections 20A or 20B can be formed with the channel, so long as the complementary connector is formed on the other mating section.

In one embodiment, one of the end pieces 20 or 40 will also include a male protuberance extending about an end face thereof. Since the shape of the end pieces are circular, it follows that the protuberance will also be circularly shaped. The other end piece necessarily will have an end face with a connector formed as a female receptacle. In FIG. 1, end face 46 is provided with the protuberance 48, while end face 26 is provided with the female receptacle 28. The end pieces 20 and 40 are fixed to encapsulating piece 60 by mating respective male protuberances into female receptacles. By forming the end faces in this maimer, additional encapsulating sections can be added if the initial one is not longitudinally long enough to cover the problematic area of the carrier pipe. Forming the end faces of the encapsulating pieces as male/female type connectors, simplifies production of all the pieces comprising the repair fitting.

The pieces 20, 40, and 60 are respectively provided with electrical leads 35, 35A; 111, 113; 55, 55A for supplying an electrical source to each section of the repair fitting 10. Either lead can be designated to function as a positive or negative electrical input, so long as each one is of opposite polarity to the other in order to cause electrical current to flow between the two lead connections, thereby supplying current throughout the pieces comprising that section. The leads are formed to accept external connecting wires terminated with connecting plugs. However, any form of leads allowing electrical connections to external equipment is useable. The function of the electrical leads will be explained in greater detail later herein.

The encapsulating piece 60, shown in FIG. 1, includes a pair of ends 62, 64 longitudinally spaced from each other. One of the ends is formed with a male connector while the other end is formed with a female connector. The end having the male or female component is irrelevant since one of the end pieces 20 or 40 will be constructed with a complementary mating component. In this instance, end 62 is provided with the male protuberance 86, which is dimensioned to frictionally slide within end piece 20 that is formed with a complementary female receptacle. Likewise, end 64 will necessarily be formed with the opposite mating component type, or with female receptacle 88 such that a male protuberance 48 on the second end piece 40 can be frictionally slid into mating engagement within the encapsulating piece 60. A sealed portal 90 is provided on the encapsulating section for tapping and testing of the repair fitting interior space 29, 49, 69, as will be explained in detail in a later section of this description.

Figure 3:
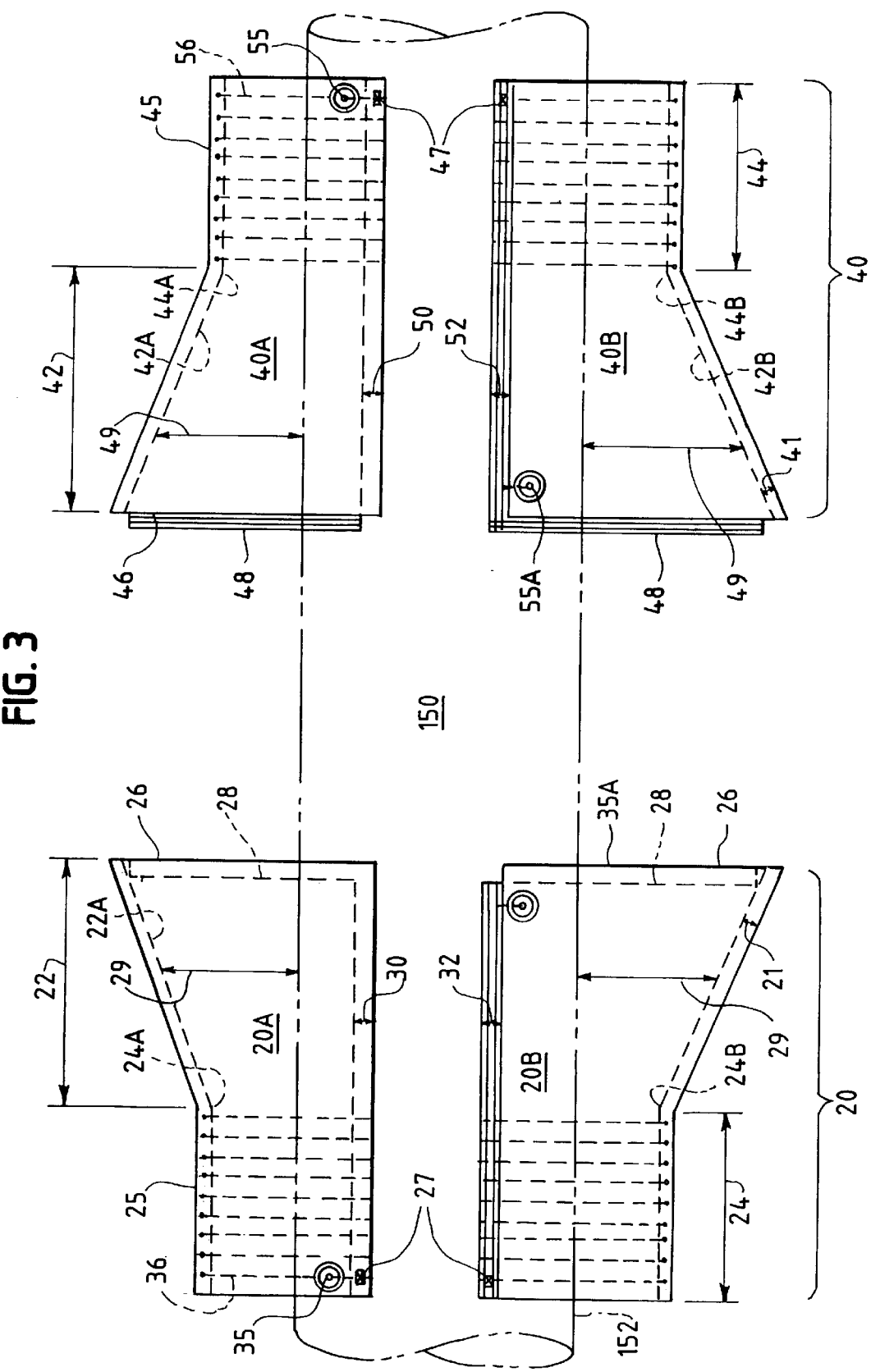
FIG. 3 is a partial cross-sectional view of the repair fitting end pieces in place over the carrier pipe, emphasizing the electrical wires implanted therein.

Turning attention to FIG. 3, each of the end pieces 20 and 40 will now be described in greater detail. As illustrated in cross-section, end piece 20 generally has a bell-shaped configuration when half sections 20A and 20B are connected together along the connecting edge "C"(See FIG. 1), and the same is true for end piece 40. When connected together, half sections 20A, 20B form a first, proximal end portion 22 and distal, second end portion 24.

The second end portion 24 forms a collar 25 which is generally circularly configured and of a diameter which ensures that inside surfaces 24A, 24B simultaneously contact against outside surface 152 of carrier pipe 150 when sections 20A and 20B are connected together. The first end portion 22 on the other hand, forms a frustoconically configured sleeve wherein the wall 21 which forms end piece 20, converges from a first and larger diameter to a second and smaller diameter, the second diameter being the same diameter as that of collar 25. When connected around carrier pipe 150, an annular space 29 is formed between outside surface 152 of the carrier piece and interior surfaces 22A and 22B. Although FIG. 3 shows each of the end pieces 20 and 40 in an unconnected state along connection edge "C" for clarity purposes, it should be clear that both sections 20A, 20B and 40A, 40B would normally be connected together such that interior surfaces 24A, 24B, 44A, 44B rest on and contact the entire surface 152, while surfaces 22A, 22B, 42A, 42B would not touch, thereby forming the continuous annular spaces 29, 49 around surface 152. The annular spaces will eventually become an important feature, as will be explained later in this section.

In this embodiment, a heating system for sealing the repair fitting comprises an electrical wire that is integrally formed within wall 21 that forms the respective upper and lower sections of the each end piece 20. The wire 36 in each section 20A, 20B is disposed such that it contours the profile of the collar 25 along a radial direction with respect to longitudinal axis "L", thereby forming a series of juxtapositioned wire loops in each half section 20A, 20B. In FIGS. 2 and 3, it is seen that the wire loops extended into lip 32 of the male connector so that the connecting edge "C" between top and bottom sections 20A, 20B can be electrically heated, along with the entire collar 25. In the case of FIG. 2A, the stepped connector having the overlapping contact point 32A closest to the pipe being repaired has wire 36 extended therein. In the stepped connector embodiment, as well as male into female connectors, where the dimensions are large enough to allow it, multiple loops of wires 36 may be used at the connection contact points as demonstrated in FIGS. 2 and 2A. Additionally, wires 36 are in electrical connection between matching sections 20A, 20B via a connection pin 27. The connection pin and contact arrangement is similar to those found in cellular phones, where the contacts on the battery mate against spring-loaded contacts. However, any manner of electrical interconnection is useable. As seen, wire 36 is provided with electrical leads 35, 35A that are connected to a central processing unit (not shown) which provides power to the heating system and which is programmed to control the supply of electrical power to the wires and the duration of time the power is provided. The processing unit also provides an audio alarm to an operator, telling him that the power has been removed (automatic).

The second end piece 40 is provided with exact features immediately described above as with end piece 20, with the exception that the second end piece has the male protuberance 48 on end face 46. The protuberance 48 on end face 46 of end piece 40 will be provided with an electrical wire within the thickness of the wall that defines the protuberance 48, in lip 52 of male connector, and in collar 45. Electrical interconnection between section halves 40A and 40B is via connection pins 47.

In the case of stepped connector construction as shown in FIG. 2a, second end piece 40 is similarly configured to link via stepped connectors rather than male into female connectors.

Likewise, FIG. 4 shows the encapsulating piece 60 in cross-section, with electrical wires 76 being implanted within the respective edges of each top and bottom section 60A and 60B. Connection pins 77 provide electrical interconnection between the mating sections 60A and 60B which are supplied with electrical leads 111 and 113.

Likewise, in the case of stepped connector construction as shown in FIG. 2a, the wire 36 extends through the lip of the stepped connector 32A having the overlapping contact point closest to the pipe being repaired, and matching reception contacts 77 are provided in the mating stepped connector.

The operation of the first embodiment of the invention will now be described with respect to repairing a hole or weak point found in carrier pipe 150. As seen in FIG. 1, upper and lower sections 60A, 60B of encapsulating piece 60 are first positioned as desired around the hole or weak point of carrier pipe 150, and then connected together by frictionally snapping the male connector 72 into female channel 74. The upper and lower sections 20A, 20B, 40A, 40B of the two end pieces are then positioned about the carrier pipe, and then similarly connected together by snapping the male connectors 32, 52 into female channels 30, 50. Each end piece 20 and 40 is then longitudinally directed towards encapsulating piece 60. The end pieces 20 and 40 are frictionally slid into complete mating engagement such that end face 64 contacts end face 46 and end face 62 contacts end face 26. Operation is similar in the case of a stepped connector construction embodiment. The stepped connectors are likewise dimensioned for an initial frictional connection.

The electrical leads 35 and 35A are then connected to the processor and the electrical source, where the processor allows electricity to flow into the selected section of the repair fitting. The current is supplied until a predetermined time allocation has passed, and an operator hears an audio signal that confirms that the connection edge "C" has fused together, as well as collar 25 melting and fusing against outside surface 152 of carrier pipe 150, thereby sealing the end piece 20 onto pipe 150.

Next, electrical leads 111 and 113 are connected to the processor and electrical source. Here, the electrical current fuses end face 26 to end face 62 as well as connection edge "C".

Finally, electrical leads 55 and 55A are connected to the processor and electrical source. Here, the electrical current fuses end face 64 to 46, connecting edge "C" and collar 44 onto pipe 150.

If multiple middle sections are used for complete coverage of a long pipe defect, they are fused each in turn, taking care to always move from a starting section pair with female connection surfaces and ending at a final section pair with a male connection, as demonstrated by the example above where section 20 was followed by section 60 and finally section 40.

In the case of natural gas pipelines, since air is entrapped within the internal annular spaces 29 49 and 69, there stands a possibility that a gas leak could slowly develop over time and mix with the entrapped air. In order to avoid this potentially explosive situation, the air spaces are filled with pipeline gas in order to push the upper and lower explosive limits into a range where combustion absolutely cannot occur. This is accomplished through provision of portal 90.

As seen in FIG. 4, housing 92 is internally provided with threads 93 along inside surface 95. The shell cutter 106 is threadingly engaged within threads 93 by provision of threaded drive 102 on shaft 104 at one end thereof, and shell cutter 106 at the other end of shaft 104. Threaded drive 102 is threadingly screwed downwardly towards surface 152 until cutter 106 contacts surface 152 and until surface 152 is pierced so as to establish fluid communication between the interior of carrier pipe 150, all interior spaces of the fitting, as well as portal housing 92. Fluid then flows into the entire space of repair fitting 10, purging all entrapped air out of portal 90. Once it is established that no more oxygen is present, sealing cap 108 is threadingly engaged downwardly onto external threads 97 on housing 92. The top surface 92T on housing 92 is provided with an annular channel 92C, in which an O-ring 91 is inserted. When cap 108 is fully threaded downwardly, the internal cap surface contacts against O-ring 91 to fully seal the cap and hence the repair fitting from leakage. In the case of explosive fluids (for example, natural gas), the fitting is now provided in a condition where explosions cannot occur due to the explosive limits being unfavorable for combustion.

Turning now to FIGS. 5 and 6, a second embodiment 10' of the invention will be described. This embodiment is applicable when the carrier pipe has been left with an external scratch or gouge in the pipe exterior surface, such that encapsulation of the entire pipe circumference would be unnecessary. Because most of the elements of this embodiment are similar to those described in the previous embodiment, like elements will use the same references as before.

The configuration of each end piece 20' and 40' is again similar, and it is seen that the bell-shape has been replaced with a shape which completely contacts the outside carrier pipe surface 152. Each end piece is formed by a wall having an outside edge which includes sides 41S, arcurate edge 41A and center 41C. However, that shape is not critical to the performance of the end piece and therefore, it is envisioned that a rectangularly configured half-ring collar, for example, can also be used.

A difference between the first embodiment and the second one lies in the arrangement or location of the embedded electrical heating wires of the heating system. Since the emphasis of this embodiment is to form a reinforcement repair over the gouged area, it is imperative to fuse the entire perimeter of the fitting to pipe 150. Thus, FIG. 6 shows that wires 36, 56 and 76, of each respective section, are disposed along outside perimeter edges. In this case, end piece 40 locates the wire along edges 41A, 41S and 41C, as well as within male protuberance 48. The same arrangement exists for end piece 20', except that this end piece does not have the protuberance; the female receptacle 28 is not provided with wire 36. Like before, the wire of each end piece 20', 40' and 60' is provided with a pair of electrical leads 35, 35A; 111, 113; 55, 55A. The location of the electrical wire 76 within the partial encapsulation piece 60' is strictly along outer edges 61 and within protuberance 86.

As before, each end section is frictionally slid inside of the respective ends of the partial encapsulating piece. Thus, application of the electrical source to the leads of each piece, will cause the embedded wires to heat to a temperature where the fitting fuses against outside carrier pipe surface 152. Again, care is taken to move in sequence between sections, starting with an end piece with a female connector (20' in FIG. 6).

In each of the pieces of the second embodiment of this invention, the extent of overlay around the surface 152 of pipe 150 could be varied, as well as the extent of surface area exposed to the heating wires. Additional partial encapsulation pieces 60' may be used, end to end. This embodiment could similarly use the stepped connector construction of FIG. 2A as well.

Further, it is to be understood that this invention is not to be limited to the details above given and described, but may be modified within the scope of the appended claims.

I claim:

1. An variable length, electrofusion repair fitting for use in repair of a hole or weak point in a polyethylene carrier pipe having a longitudinal axis and an outside surface which defines a pipe circumference, comprising:

an encapsulating piece for covering the hole or weak point in the carrier pipe, said encapsulating piece having a wall with a wall thickness and a pair of longitudinally spaced ends, each of said ends having an end surface, said encapsulating piece including electrical wires integrally formed therein, having a pair of electrical leads for connecting electrical current, which said electrical wires extend between;

a first end piece for attachment to said encapsulating piece at one of said ends thereof, said first end piece having a wall with a wall thickness and a pair of ends, said ends having respective end surfaces defined by said wall thickness, said first end piece including electrical wires integrally formed therein having a pair of electrical leads for connecting electrical current, said electrical wire terminating at said electrical leads;

a second end piece for attachment to said encapsulating piece at the other of said end thereof, said second end piece having a wall with a wall thickness and a pair of ends, said ends having respective end surfaces defined by said wall thickness, said second end piece including an electrical wire integrally formed therein for providing an electrical current to said end piece, said electrical wire terminating in a pair of electrical leads, wherein when each of said end pieces are attached to said encapsulating piece, said electrical wires implanted within each of said pieces such that when an electrical current is applied to said electrical leads, said pieces become heated, thereby melting said pieces to each other and to said carrier pipe so as to seal said weak point or hole.

2. The repair fitting of claim 1, wherein one of said end surfaces of said first end piece is formed as a male connector, one of said end surfaces of said second end piece is formed as a female connector, and said encapsulating piece has one end surface formed as a female connector for mating connection with said male end surface of said first end piece and the other end surface formed as a male connector for mating connection with said female end surface of said second end piece.

3. The repair fitting of claim 1, wherein one of said end surfaces of said first end piece is formed as an inside stepped connector, one of said end surfaces of said second end piece is formed as an outside stepped connector, and said encapsulating piece has one end surface formed as an outside stepped connector for mating connection with said inside stepped end surface of said first end piece and the other end surface formed as an inside stepped connector for mating connection with said outside stepped end surface of said second end piece.

4. The repair fitting of claim 1, wherein said first and second end pieces are respectively formed as mating section halves which encapsulate the entire circumference of said carrier pipe, and wherein said encapsulating piece is formed as mating section halves which encapsulate the entire circumference of said carrier pipe.

5. The repair fitting of claim 4, wherein said end pieces and said encapsulating piece are each split in half along a common axis, which said axis is coincidental with said longitudinal axis of said carrier pipe.

6. The repair fitting of claim 5, wherein said end pieces have identical bell-shaped cross-sectional profiles, wherein said walls of each said end piece are provided with respective electrical wires formed integrally therein, said electrical wires respectively connected to said electrical leads and wherein said wall of said encapsulating piece is provided with electrical wires formed integrally therein, said electrical wires in said encapsulating piece in electrical contact with said electrical wires of each of the respective half pieces.

7. The repair fitting of claim 6, wherein one of said end surfaces of said first end piece is formed as a male connector, one of said end surfaces of said second end piece is formed as a female connector, and said encapsulating piece has one end surface formed as a female connector for mating connection with said male end surface of said first end piece and the other end surface formed as a male connector for mating connection with said female end surface of said second end piece, and said male connector of said encapsulating piece and said end piece include a respective electrical wire formed integrally therein, said electrical wires within said male connectors in electrical communication with said electrical wires formed in said end pieces and said encapsulating piece.

8. The repair fitting of claim 7, wherein said electrical wire in said male connector has more than one loop formed therein.

9. The repair fitting of claim 6, wherein one of said end surfaces of said first end piece is formed as an inside stepped connector, one of said end surfaces of said second end piece is formed as an outside stepped connector, and said encapsulating piece has one end surface formed as an outside stepped connector for mating connection with said inside stepped end surface of said first end piece and the other end surface formed as an inside stepped connector for mating connection with said outside stepped end surface of said second end piece, and said inside stepped connector of said encapsulating piece and said end pieces include a respective electrical wire, said electrical wires disposed proximate said inside stepped connectors.

10. The repair fitting of claim 9, wherein said electrical wire of said inside stepped connector has more than one loop formed therein.

11. The repair apparatus of claim 1, wherein more than one of said encapsulating pieces are used, increasing length of coverage over said polyethylene carrier pipes longitudinal axis.

12. The repair fitting of claim 1, wherein an internal annular space is formed between said fitting and said outside surface of said carrier pipe when said end pieces and said encapsulating piece are connected together.

13. The repair fitting of claim 12, wherein one of said end surfaces of said first end piece is formed as a male connector, one of said end surfaces of said second end piece is formed as a female connector, and said encapsulating piece has one end surface formed as a female connector for mating connection with said male end surface of said first end piece and the other end surface formed as a male connector for mating connection with said female end surface of said second end piece, and one of said ends of each of said end pieces has a wall that is circularly shaped so as to closely fit about said outer surface of said carrier pipe, while the other end thereof forms an annular space between said wall of said end piece and said outer surface of said carrier pipe, said other end of said end piece terminating in one of said male and female connectors.

14. The repair fitting of claim 12, wherein one of said end surfaces of said first end piece is formed as an inside stepped connector, one of said end surfaces of said second end piece is formed as an outside stepped connector, and said encapsulating piece has one end surface formed as an outside stepped connector for mating connection with said inside stepped end surface of said first end piece and the other end surface formed as an inside stepped connector for mating connection with said outside stepped end surface of said second end piece, and one of said ends of each of said end pieces has a wall that is circularly shaped so as to closely fit about said outer surface of said carrier pipe, while the other end thereof forms an annular space between said wall of said end piece and said outer surface of said carrier pipe, said other end of said end piece terminating in one of said inside and outside stepped connectors.

15. The repair fitting of claim 12, wherein said encapsulating piece includes a portal formed into said wall thereof, said portal in fluid communication with said internal annular space.

16. The repair fitting of claim 15, wherein said portal includes a closing cap for sealably preventing fluid communication between said internal annular space and atmosphere.

17. The repair fitting of claim 1, wherein said first and second end pieces only encapsulate a portion of the circumference of said carrier pipe, and wherein said encapsulating piece only encapsulates a portion of said circumference of said carrier pipe.

18. The repair fitting of claim 17, wherein more than one of said encapsulating pieces are used, increasing length of coverage over said polyethylene carrier pipes longitudinal axis.

19. The repair fitting of claim 17, wherein one of said end surfaces of said first end piece is formed as a male connector, one of said end surfaces of said second end piece is formed as a female connector, and said encapsulating piece has one end surface formed as a female connector for mating connection with said male end surface of said first end piece and the other end surface formed as a male connector for mating connection with said female end surface of said second end piece, and said male connector of said encapsulating piece and said end piece include a respective electrical wire formed integrally therein, said electrical wires within said male connectors in electrical communication with said electrical wires formed in said respective end and encapsulating pieces.

20. The repair fitting of claim 19, wherein said electrical wire in said male connector has more than one loop formed therein.

21. The repair fitting of claim 17, wherein one of said end surfaces of said first end piece is formed as an inside stepped connector, one of said end surfaces of said second end piece is formed as an outside stepped connector, and said encapsulating piece has one end surface formed as an outside stepped connector for mating connection with said inside stepped end surface of said first end piece and the other end surface formed as an inside stepped connector for mating connection with said outside stepped end surface of said second end piece, and said inside stepped connector of said encapsulating piece and said end piece include a respective electrical wire formed integrally therein, said electrical wires within said inside stepped connectors in electrical communication with said electrical wires formed in said respective end and encapsulating pieces; and said electrical wire is further disposed integrally along a perimeter of said repair fitting in each end piece and encapsulating piece.

22. The repair fitting of claim 21, wherein said electrical wire in said inside stepped connector has more than one loop formed therein.

23. A method for repairing a carrier pipe having a fluid flowing inside the pipe, said pipe having a repairable defect on a surface thereof, comprising:

providing a repair fitting over said defect, said fitting comprised of multiple pieces fitted to each other at joints, said fitting having a pair of ends and at least one midsection there between; and heating said ends and said joints between said pieces for a predetermined length of time so as to fuse said ends onto said surface and said fitting pieces joints to each other.

24. The method of claim 23 wherein said ends are configured so as to form an annular space between a portion of each end and said midsection and said surface of said carrier pipe.

25. The method of claim 24 further including the step of piercing said fitting and said pipe surface to flow fluid from inside said pipe into said annular space and the atmosphere so as to purge air out of said annular space, then sealing said fitting.

26. A method for repairing pipe as claimed in claim 23 wherein heating occurs along perimeter edges of said repair fitting fusing it onto said carrier pipe.

* * * * *